US010122861B2

(12) United States Patent
Fransson et al.

(10) Patent No.: US 10,122,861 B2
(45) Date of Patent: Nov. 6, 2018

(54) METHOD FOR FASTER CONNECTION OF USERS USING VOICE OVER IP COMMUNICATION

(71) Applicant: SINCH AB, Nacka Strand (SE)

(72) Inventors: Bjorn Fransson, Nacka (SE); Jonas Lindroth, Nacka Strand (SE)

(73) Assignee: SINCH AB, Nacka Strand (SE)

( * ) Notice: Subject to any disclaimer, the term of this patent is extended or adjusted under 35 U.S.C. 154(b) by 76 days.

(21) Appl. No.: 15/288,563

(22) Filed: Oct. 7, 2016

(65) Prior Publication Data

US 2017/0126897 A1 May 4, 2017

Related U.S. Application Data

(60) Provisional application No. 62/250,270, filed on Nov. 3, 2015.

(51) Int. Cl.
*H04L 12/16* (2006.01)
*H04M 7/00* (2006.01)
*H04M 3/42* (2006.01)
*H04W 76/11* (2018.01)

(52) U.S. Cl.
CPC ..... *H04M 7/0006* (2013.01); *H04M 3/42102* (2013.01); *H04M 7/003* (2013.01); *H04W 76/11* (2018.02); *H04M 3/42195* (2013.01); *H04M 7/0024* (2013.01); *H04M 2203/2016* (2013.01)

(58) Field of Classification Search
CPC ............... H04M 7/0006; H04M 7/003; H04M 3/42102; H04M 2203/2016; H04M 7/0024; H04M 3/42195; H04W 76/021
See application file for complete search history.

(56) References Cited

U.S. PATENT DOCUMENTS

| 2004/0190498 | A1* | 9/2004 | Kallio ................... H04M 7/128 370/352 |
| 2008/0139228 | A1* | 6/2008 | Raffel ............... H04M 3/42195 455/466 |
| 2010/0130169 | A1 | 5/2010 | Narayanaswamy et al. |
| 2013/0178237 | A1 | 7/2013 | Manyakin, Jr. et al. |

FOREIGN PATENT DOCUMENTS

EP 2031933 A1 3/2009

* cited by examiner

*Primary Examiner* — Afshawn M Towfighi
(74) *Attorney, Agent, or Firm* — K&L Gates LLP

(57) ABSTRACT

A method for establishing communication between a first communication device (110) of a first communication network (180) and a second communication device (120a, 120b) of a second communication network (160) is disclosed. In one embodiment, a service provider (130) receives a message indicative of an intention of the first device to call the second device. A communication provider (140) in communication with the service provider establishes a communication channel with the second device via the second network based on the message received at the service provider and connects the communication channel established between the communication provider and the second device with another communication channel established in response to an incoming call from the first device to the communication provider via the first network. The establishment of the communication channel between the communication provider and the second device is initiated before establishment of the other communication channel is completed.

20 Claims, 7 Drawing Sheets

METHOD FOR FASTER CONNECTION OF USERS USING VOICE OVER IP COMMUNICATION

CROSS REFERENCE TO RELATED APPLICATIONS

This application claims the benefit of U.S. Provisional Application No. 62/250,270, filed Nov. 3, 2015, the disclosure of which is incorporated herein by reference in its entirety.

TECHNICAL FIELD

The present disclosure relates generally to the field of telecommunications. The present disclosure relates in particular to establishment of communication between a first communication device of a first communication network and a second communication device of a second communication network.

BACKGROUND

International calling between two communication devices may be directly made via the public switched telephone network (PSTN) involving mobile communication networks and/or circuit-switched communication networks. Such international calls, however, are often highly charged from telecommunications operators and other more affordable alternatives are desired.

Alternatives to avoid high rates (or to at least reduce the charged rate) for International calls may be based on connection of two local telephone calls at a communication provider providing a voice call service. However, such alternatives for connection of users of the voice call service may take a long time and the delay (referred to as call setup delay, or CSD) may last for several tens of seconds, which may be experienced by the user initiating the call as something that went wrong and may decide to hang up the phone in order to abandon or retry the attempted calling.

A general challenge in the present technical field is therefore to provide affordable alternatives for International calling, which alternatives may also further reduce the delay for establishment of the call.

SUMMARY

An object of at least some embodiments of the present disclosure is to wholly or at least partly address one or more of the above mentioned issues.

This and other objects are achieved by means of a method, an application component and a communication server system as defined in the appended independent claims. Other embodiments are defined by the dependent claims.

In connection with a first aspect of the present disclosure, a method for establishing communication between a first communication device of a first communication network and a second communication device of a second communication network is provided. In the present method, a service provider receives a message indicative of an intention of the first communication device to call the second communication device. A communication provider in communication with the service provider may establish a communication channel with the second communication device via the second communication network based on the message received at the service provider. The communication provider may then connect the communication channel established between the communication provider and the second communication device with a communication channel established in response to an incoming call from the first communication device to the communication provider via the first communication network. The establishment of the communication channel between the communication provider and the second communication device is initiated before establishment of the communication channel between the first communication device and the communication provider is completed.

In connection with a second aspect, an application component for providing communication via an application of a service provider is provided. The application component may be configured to bring a first communication device of a first communication network in communication with a second communication device of a second communication network by causing a communication provider to receive, from the service provider, a message indicating an intention of the first communication device to call the second communication device. The component may also cause the communication provider to establish a communication channel with the second communication device via the second communication network based on the received message and to connect the communication channel established between the communication provider and the second communication device with a communication channel established in response to an incoming call from the first communication device to the communication provider via the first communication network. The establishment of the communication channel between the communication provider and the second communication device is initiated before establishment of the communication channel between the first communication device and the communication provider is completed.

In connection with a third aspect, a communication server system is provided. The communication server system may include a service provider and a communication provider. The service provider may be configured to receive a message indicative of an intention of a first party to call a second party. The communication provider may be configured to establish a call with the second party based on the message received at the service provider and to connect the call established with the second party with an incoming call from the first party. The service provider and the communication provider may be in communication with each other and the establishment of the call between the communication provider and the second party may be initiated before establishment of the incoming call from the first party to the communication provider is completed.

In an embodiment of this third aspect, the first party may include a first communication device configured to communicate with the communication provider via a first communication network and the second party may include a second communication device configured to communicate with the communication provider via a second communication network.

In these first, second and third aspects, the communication provider is informed via the service provider of the intention of (a user of) the first communication device to call (a user of) the second communication device and before the communication channel between the communication provider and the first communication device is established, the communication provider initiates the establishment of the communication channel with the second communication device. The communication provider is configured to establish the communication channel with the second communication device while the first communication device is calling in (i.e. calling the communication provider). As a result, the two communication channels are established in parallel (or concurrently) and the total time for establishing the communication between the first communication device and the second communication device is reduced as compared to a situation in which the establishment of the communication channel between the communication provider and the second communication device would only be initiated once the communication channel between the first communication device and the communication provider is established (i.e. once the incoming call from the first communication device has been received at the communication provider). In other words, the establishment of the communication channel between the second communication device and the communication provider (which may also be referred to as the second "leg" in the end-to-end call to be established between the first communication device and the second communication device) may be performed concurrently with the establishment of the communication channel between the communication provider and the first communication device (which may be referred to as the first "leg").

In the embodiments defined by these first, second and third aspects, an International call may be established between two communication devices using two local communication channels, a first communication channel between the communication provider and the first communication device located in a first country and a second communication channel between the communication provider and the second communication device located in a second country. The use of two local communication channels (or two local calls in respective countries) reduces the total cost for the communication between the two communication devices.

Further, as the second communication channel is established concurrently with the establishment of the first communication channel, the total time for setting up the communication is reduced. In these first, second and third aspects, a message informing that the first communication device intends to call the second communication device (or that it is currently calling the communication provider in an attempt to reach the second communication device) is received at the service provider before the call from the first communication device has been received at the communication provider.

In the context of the present disclosure, the service provider may provide a service via an application software installed at the first communication device and the communication provider may be a server connected to the service provider for providing communication within the framework of the application (or service) provided by the service provider. In some embodiments, the application software provided by the service provider may also be installed at the second communication device.

In some embodiments of the first, second and third aspects, the service provider and the communication provider may be the same entity (e.g. a communication server system or communication server unit). In particular, the service provider and the communication provider may be implemented as a server on the Internet in connection with the first and the second communication devices via the first communication network and the second communication network, respectively. The message sent from the first communication device for indicating the intention to call the second communication device may then be directly received at this common entity (i.e. directly received at the communication provider).

These first, second and third aspects may be illustrated in the following example, in which a connection between users of a voice call service provided by a service provider is to be established. According to this specific example, a user A (that tries to call a user B using the provided service via its first communication device) may use a supplementary channel (e.g. the Internet) to in advance alert the service provider about the intention to call user B (i.e. send a message to the service provider for indicating its intention to call user B). The service provider may start establishing the second "leg" of the call via the communication provider (to/from the communication provider from/to user B) already when receiving the alert. When both legs of the call (from user A to the service provider, and to/from the service provider from/to user B) are established, the service provider bridges the two calls together such that user A and user B may talk to each other. When establishing the second leg, the service provider may either call B, or send instructions to B to call the service provider.

According to these first, second and third aspects, (a user A of) the first communication device may use a supplementary channel (e.g. the Internet) to send a message (i.e. to alert) the service provider about its intention to call (a user B of) the second communication device. At approximately the same time (or shortly thereafter or before), the user A of the first communication device calls the communication provider, i.e. the establishment of the first leg or communication channel (between the first communication device and the communication provider) is initiated. The total time for establishing the communication channel between the first communication device and the communication provider may be called $t_A$. When the service provider receives the message (the alert), the service provider may directly instruct the communication provider to start establishing the second leg or communication channel (between the communication provider and the second communication device) of the call without first having to wait for establishment of the first leg to complete. The total time for establishing the communication channel between the communication provider and the second communication device may be called $t_B$. According to this procedure, the total time taken for establishing (or setting up) the end-to-end call between user A of the first communication device and user B of the second communication device is reduced to $t_{CSD} = \max(t_A, t_B + t_{PBX})$, and the risk of $t_{CSD}$ becoming too large is thus lowered. The time $t_{PBX}$ corresponds to the time for sending, receiving and processing the alert, which may be assumed to be much shorter than both $t_A$ and $t_B$. In a more traditional manner of setting up an end-to-end call in which a first call is made from user A to a service provider (taking a time $t_A$) and then, once the first call is established, the service provider establishes a call with user B (taking an additional time $t_B$) for finally bridging the two calls together, the total time taken before user A is able to talk to user B is on the order of $t_{CSD} = t_A + t_B$. The call setup delay (CSD) is therefore reduced in the embodiments of the first, second and third aspects.

It will be appreciated that in the above equations the time for bridging the two calls at the communication provider has been neglected. It may be added to the equations in order to provide a more accurate value of $t_{CSD}$.

The setup procedure according to the first, second and third aspects are based on a parallel establishment of the first leg and the second leg (on a time perspective) instead of a sequential establishment of the two legs. The parallel (or concurrent) establishment of the first leg and the second leg of the end-to-end call is realized by user A of the first communication device sending (using a supplementary channel such as the Internet) an alert (or message) to the service provider about the intention to call user B of the second communication device. The establishment of the first leg may be initiated at approximately the same time as the alert is sent from the first communication device in order to further reduce CSD.

In the context of the present disclosure, the first communication device (or its user) may also be referred to as the source device, the first party or the caller (or calling device) while the second communication device (or its user) may be referred to as the destination device, the second party or the callee (or called device).

It will also be appreciated that in the context of the present disclosure, the terms "leg" or "communication channel" may also be referred to as "call". These terms may be interchangeably used.

In an embodiment, the service provider may send to the communication provider a message indicating an incoming call from the first communication device via the first communication network and including information for establishment of the communication channel with the second communication device. The service provider may be a server connected to the first communication device using an application software providing a service offered by the service provider. As the first communication device dials a given telephone number (in an attempt to call the second communication device), the service provider may identify which second communication device is intended to be called and the communication provider is informed accordingly. The second communication device may for example be identified by its telephone number, i.e. the message received at the service provider (and subsequently at the communication provider) from the first communication device (user A) may directly indicate the telephone number of the second communication device (user B's telephone number). Alternatively, in another example, the second communication device may be identified in the message by a user id and the service provider may retrieve, via e.g. a register, the telephone number associated with the second communication device.

In one embodiment, the service provider may send an acknowledgement of the message to the first communication device. In particular, the acknowledgement may include an identity of a communication channel for the first communication device to call the communication provider via the first communication network. For example, the service provider may provide a telephone number (or access number) to the first communication device for calling the communication provider.

According to an embodiment, the acknowledgement from the service provider may be sent simultaneously to the service provider sending information to the communication provider for establishment of the communication channel between the communication provider and the second communication device. As a result, the communication provider may start establishing a communication channel with the second communication device before having received the call from the first communication device.

In some other embodiments, the first communication device may already possess the telephone number (or access number) to call the communication provider. Approximately at the same time as the first communication device dials this telephone number, it may be configured to send a message to the service provider informing that it intends to call the second communication device. The service provider may then inform the communication provider which, in response to this information, may start establishing the second communication channel (with the second communication device) while it awaits the incoming call from the first communication device.

According to some embodiments, the service provider may receive the message (indicative of an intention of the first communication device to call the second communication device) from the first communication device via an Internet connection (between the first communication device and the service provider). For this purpose, the first communication device may be equipped with Internet communication capabilities. The first communication device may have access to an IP network or the Internet and may be able to send a message via the Internet to the communication provider. The first communication device may for example be a mobile communication device with Internet connection such as a smartphone. The message may then be sent in a faster manner than the establishment of a communication channel between the first communication device and the communication provider, i.e. the message may be received at the service provider, and subsequently at the communication provider, before the communication channel between the first communication device and the communication provider has been established.

According to some embodiments, the first communication network may include at least one of a mobile network, a packet-switched network and a circuit-switched telephone network. In particular, the first communication device may communicate with the communication provider via any network of the PSTN, such as a mobile network, a packet switched network or a circuit-switched network. The first communication channel between the first communication device and the communication provider may be established via at least one of a network of the PSTN. It will be appreciated that other elements such as gateways may also be involved for establishing the communication between the first communication device and the communication provider.

According to an embodiment, establishing the communication channel between the communication provider and the second communication device may comprise establishing an outgoing call from the communication provider to the second communication device via the second communication network. In the present embodiment, the communication provider is configured to call the second communication device. The second communication device may be any communication device, such as a mobile telephone or a standard landline phone. The communication provider may call a number associated with the second communication device and a communication channel may be established between the communication provider and the second communication device via any network of the PSTN.

According to another embodiment, establishing the communication channel between the communication provider and the second communication device may comprise the service provider instructing the second communication device to call the communication provider. In this embodiment, instead of the communication provider making an outgoing call to the second communication device to establish the second leg of the communication, the second communication device is instructed to call the communication provider. The present embodiment is therefore based on the use of an incoming call from the second communication device for establishing the second communication channel.

In particular, the communication provider may send a message including an identity of a communication channel for the second communication device to call the communication provider via the second communication network. For example, the service provider may provide a telephone number to the second communication device for calling the communication provider.

The message may be sent from the communication provider (or the service provider) to the second communication device via an Internet connection. For this purpose, the second communication device may be equipped with Internet communication capabilities. The second communication device may have access to an IP network or the Internet and may be able to receive a message via the Internet from the communication provider (or the service provider). In these embodiments, the second communication device may for example be a mobile communication device with Internet connection, such as a smartphone.

In an embodiment, the communication provider establishes the communication channel with the first communication device upon reception of the incoming call from the first communication device.

According to some embodiments, the communication between the first communication device and the second communication device may be at least one of a voice call, a video call and a text chat.

It will be appreciated that other embodiments using all possible combinations of features recited in the above described embodiments may be envisaged.

BRIEF DESCRIPTION OF THE DRAWINGS

Exemplifying embodiments will now be described in more detail, with reference to the following appended drawings.

As illustrated in the figures, the sizes of the elements may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
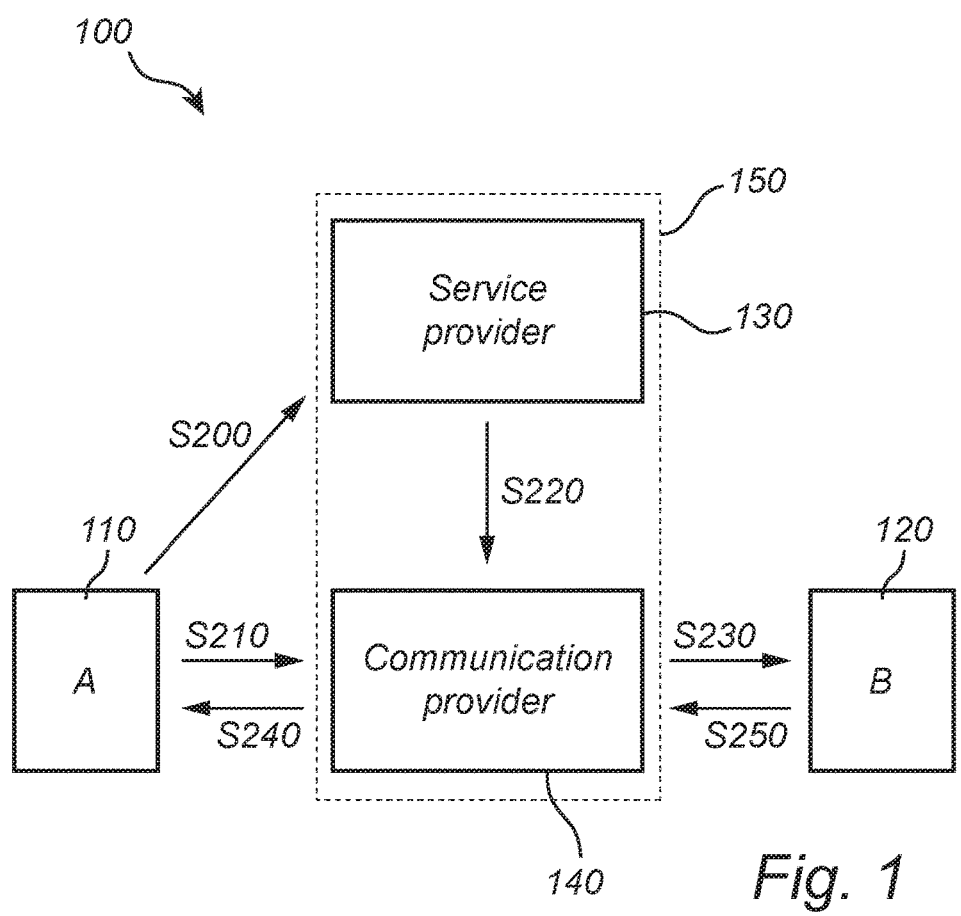
FIG. 1 shows a communication system in accordance with an embodiment.
Figure 3:
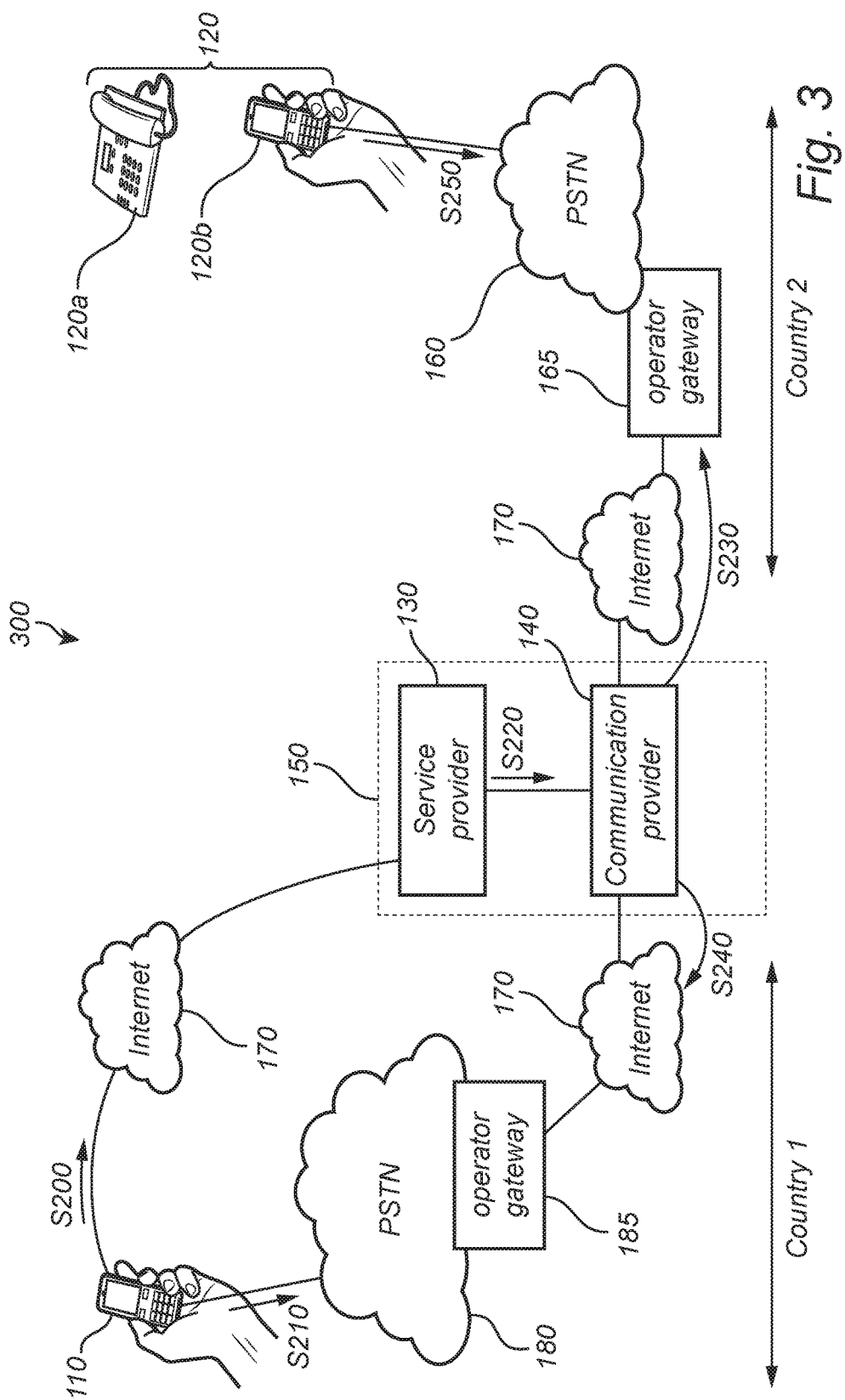
FIG. 3 shows a schematic view of a communication system for establishment of an end-to-end call in accordance with the procedure shown in FIG. 2.

With reference to FIG. 1, a communication system 100 according to an embodiment is described. FIG. 3 shows a communication system 300 which may be equivalent to the communication system 100 shown in FIG. 1 except that further details about the communication networks are illustrated.

FIG. 1 shows a communication system including a first party A or first communication device 110, a second party B or second communication device 120, a service provider 130 and a communication provider 140 (which may also be referred to as a telecommunication platform 140). The service provider 130 and the communication provider 140 may be two separate servers. However, in some embodiments, the service provider 130 and the communication provider 140 may be included in the same entity, thereby forming a single communication server system (or communication server arrangement) 150.

Referring more particularly to the communication system 300 shown in FIG. 3, the first communication device 110 may be configured to communicate with the communication provider 140 via a first communication network including the PSTN 180 and the Internet (or IP network) 170. The first communication device 110 may be any type of communication devices capable of communicating in a wireless environment. The first communication device 110 may be any user equipment capable of providing (direct) Internet connection to the service provider 130 via the Internet 170 and telecommunications with the communication provider 140 via the PSTN 180. By way of example, the first communication device 110 may be a handset, a tablet, a laptop computer, a mobile phone, a cellular telephone or a smartphone.

The first communication device 110 may be configured to communicate with the communication provider 140 via a mobile network (including for example base stations and other radio controllers), a packet switched telephone network or a circuit-switched telephone network.

The first communication network (or communication system 300) may further include a gateway 185 for providing an interface between the PSTN 180 and the Internet 170. The gateway 185 may be part of the network 180 provided by the local telecommunications operator used by the first communication device 110 located in a first country and may act as a network node equipped for interfacing with another network using a different communication protocol (the Internet 170 in the present example).

The first communication device 110 may be configured to communicate with the service provider 130 via the Internet 170. The service provider 130 may be a server providing services to the first communication device 110 in the form of an application ("app") installed on the first communication device 110. The service is provided to the first communication device 110 via the Internet 170. As mentioned earlier, the service provider 130 and the communication provider 140 may be integrated in the same unit 150 or the service provider 130 may be considered to be an integrated part of the communication provider 140, and vice versa. For the purpose of illustration, the service provider 130 and the communication provider 140 are considered to be two separate units (or servers) in the following.

Figure 2:
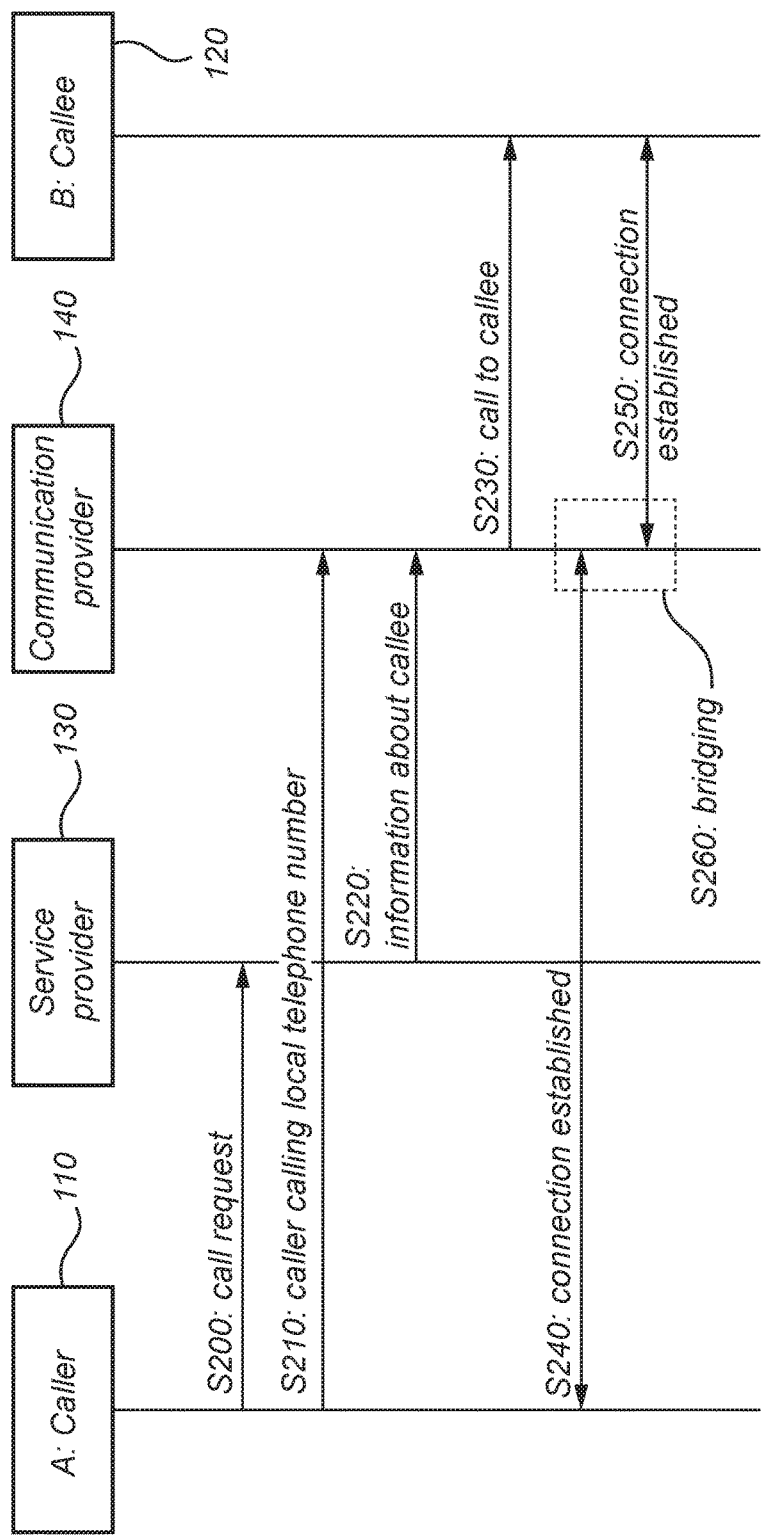
FIG. 2 illustrates a procedure for establishment of an end-to-end call in accordance with an embodiment.

The second communication device 120a, 120b (which is more generally referred to as the second communication device 120 in FIGS. 1 and 2) may be equivalent to the first communication device 110 but does not necessarily need to have Internet access. The second communication device may be configured to communicate with the communication provider 140 via a second communication network including the PSTN 160 and the Internet 170. The second communication device 120 may be any type of communication devices capable of communicating in a wireless environment such as a cellular phone or smartphone 120b but may also be a landline telephone 120a.

The second communication device 120a, 120b may be configured to communicate with the communication provider 140 via the PSTN 160 including for example a mobile network (with for example base stations and other radio controllers), a packet switched telephone network or a circuit-switched telephone network.

The second communication network (or communication system 300) may further include a gateway 165 for providing an interface between the PSTN 160 and the Internet 170. The gateway 165 may be part of the network 160 provided by the local telecommunications operator (i.e. in the second country) used by the second communication device 120a, 120b and may act as a network node equipped for interfacing with another network using a different communication protocol (the Internet 170 in the present example).

The communication server system 150 by means of the communication provider 140 may be configured to provide voice, data, applications, and/or voice over internet protocol (VoIP) services to the first communication device 110 and the second communication device 120a, 120b through the first communication network and the second communication network, respectively.

Referring to FIGS. 1-3, a procedure for establishing communication between the first communication device 110 and the second communication device 120a, 120b will be described in more detail in the following.

For the purpose of the example, the first communication device or source device 110 may be considered to be located in a first country while the second communication device or destination 120a, 120b may be located in a second different country.

The user A of the first communication device 110 using an application provided by the service provider 130 may at some point in time desire to call user B of the second communication device 120a, 120b. At S200, the first communication device may for this purpose send a call setup request (or call request) to the service provider 130 via the Internet 170. The call setup request may be a message or alert indicating the intention of user A to call user B.

Simultaneously (or shortly before or thereafter), the first communication device 110 will at S210 call a local telephone number (i.e. a telephone number for calling a recipient located in the first country) to reach the communication provider 140. The telephone number may be predetermined as provided (or redirected) by the service provider in an earlier registration procedure (e.g. a procedure for entering contact details in the application offered by the service provider 130). The local telephone number dialed by the first communication device 110 is a number associated with the communication provider 140. The call from the first communication device 110 to the communication provider 140 is a local call (in the first country) using the local operator to which the user of the first communication device 110 subscribes.

While the communication channel (or call) between the first communication device 110 and the communication provider 140 is completely established (via the PSTN 180, the gateway 185 and the Internet 170), the service provider 130 having received the message from the first communication device 110 informs at S220 the communication provider 140 about the intention of user A of the first communication device 110 to call user B of the second communication device 120. The information sent from the service provider 130 to the communication provider 140 may be information about the contact details, such as the telephone number, of the second communication device 120a, 120b and information that a call from the first communication device 110 is to be expected.

Before establishment of the call from the first communication device 110 is received at the communication provider 140, i.e. before establishment of the communication channel between the first communication device 110 and the communication provider 140, the communication provider 140 at S230 initiates a call to the second communication device 120a, 120b (i.e. establishes a communication channel with the second communication device 120a, 120b) via the second communication network (including the Internet 170, the gateway 165 and the PSTN 160). The call from the communication provider 140 is received at the second communication device 120a, 120b as a local call (i.e. in the second country) using the local operator to which the user of the second communication device 120a, 120b subscribes.

At S240, the communication provider 140 receives (or answers to) the call from the first communication device 110 and a communication channel (or first leg of the call) is established between the first communication device 110 and the communication provider 140. The first communication device 110 and the communication provider 140 are then connected.

At S250, concurrently with S240, the second communication device 120a, 120b answers to the call from the communication provider 140 and a communication channel (or second leg of the call) is established between the second communication device 120a, 120b and the communication provider 140. The second communication device 120a, 120b and the communication provider 140 are then connected.

At S260, the communication provider 140 bridges the two legs of the end-to-end call, i.e. connects the communication channels established with the first communication device 110 and the second communication device 120a, 120b, and user A of the first communication device 110 can start talking with user B of the second communication device 120a, 120b.

Although it is here described that the communication channel between the first communication device 110 and the communication provider 140 is completely established at S250 before the communication channel between the second communication device 120a, 120b and the communication provider 140 is completely established at S260, it will be appreciated that the communication channel between the second communication device 120a, 120b and the communication provider 140 may be completely established before the communication channel between the first communication device 110 and the communication provider 140 is completely established.

In the present embodiments, the total time for setting up the call between user A (communication device 110) and user B (communication device 120a, 120b) will correspond to the longest of the two times $t_A$, the time it takes to establish "$call_A$" the call leg (or communication channel) between user A and the communication provider 140, and $t_B + t_{PBX}$ where $t_B$ is the time it takes to establish "$call_B$" the call leg (or communication channel) between user B and the communication provider 140 and $t_{PBX}$ is the time it takes for the alert (or call setup request) to be sent from user A and received and processed at the service provider 130 and the communication provider 140. It is here assumed that user A of the first communication device 110 starts calling the communication provider 140 at substantially the same time as it sends the message indicative of its intention to call user B to the service provider.

It is also assumed that the time for the communication provider 140 to bridge the two established communication channels is negligible. However, this time may also be taken into account and it will be appreciated that other times may be added to the above mentioned times before user A starts talking to user B.

Referring to FIG. 2, the total time for connection of user A to user B corresponds to the longest of the two times for (i) performing S210 and S240 (i.e. establishment of call$_A$) and (ii) performing S200, S220, S230 and S250 (i.e. transmission and processing of the call setup request and establishment of call$_B$). The present embodiments take advantage of the fact that a message from the first communication device (such as mobile phones, smartphones) may be transmitted via the Internet faster than the establishment of a telecommunication via the PSTN and an IP network (the Internet).

In the present embodiments, user A may have an application (app) offered by the service provider 130 installed on its communication device (could also be referred to as handset or mobile phone) 110 and the first communication device 110 may be capable of performing a REpresentational State Transfer (REST) Application Programming Interface (API) call in parallel with (in some embodiments this call is performed simultaneously, right before, or shortly thereafter) the initiation of a call to the PSTN. The REST API call is used to provide a head start for initiation of call$_B$, i.e. to provide an alert to the communication provider to initiate the second leg of the call (and also to inform about the incoming call, call$_A$, from user A). It will be appreciated that REST is just an example of a common API type call to illustrate the present embodiment. Other types of API calls may be used in the context of the present embodiment and, more generally, in other embodiments described in the present disclosure.

Referring more specifically to FIG. 3, it will be appreciated that the time referred to as $t_A$ is the time to set up the call (call$_A$) from the handset of user A (i.e. the first communication device 110), to a PSTN 180 (e.g. a local mobile network), through a gateway 185 to an IP network 170 and then to the communication provider (or platform) 140.

Similarly, the time referred to as $t_B$ is the time to set up the call (call$_B$) from the platform 140 over an IP network 170, through a gateway 165 to the PSTN 160 (e.g. a local mobile network) and then to the landline telephone 120a or the handset 120b.

As mentioned above, the time referred to as $t_{PBX}$ corresponds to the time it takes for the message sent from the handset 110 to reach the service provider 130 through an IP network (the Internet) 170, the time it takes to apply any logic needed to retrieve the destination (i.e. the telephone number to user B) and the time it takes to transmit the information about the callee to the communication provider 140.

The total time for connection of the first communication device 110 to the second communication device 120a, 120b may therefore be expressed as MAX($t_A$, $t_B$+$t_{PBX}$). This can be compared to a more traditional procedure in which user A intends to call user B via a platform, A makes an outgoing call (call$_A$) to the platform via the PSTN and, after reception of call$_A$, the platform makes an outgoing call (call$_B$) to user B. In this case, the total time for the connection of user A to user B is the aggregation (or sum) of the time $t_A$ to establish call$_A$, the time $t_B$ to establish call$_B$ and an overhead time $t_{overhead}$ for performing any necessary logic at the platform to retrieve the destination number of user B and to connect the two calls. In this more traditional procedure, the call setup delay may be expressed as $t_{CSD}=t_A+t_B+t_{overhead}$. The present embodiments therefore provide for a reduction of the call setup delay as compared to such traditional procedures.

For illustrative purposes only, the more traditional procedure described above may take up to approximately fourteen seconds (about 6-7 seconds for $t_A$, about 0.5-1 second for $t_{overhead}$, and about 7 seconds for call$_B$). In comparison, the total time for connection of user A to user B in similar conditions (i.e. considering the same countries for location of user A and user B) in the embodiments of the present disclosure may be in the range of 7-8 seconds. It will be appreciated that these values are only provided as examples and other values may be applicable for establishment of calls with users being positioned in other countries.

Figure 4:
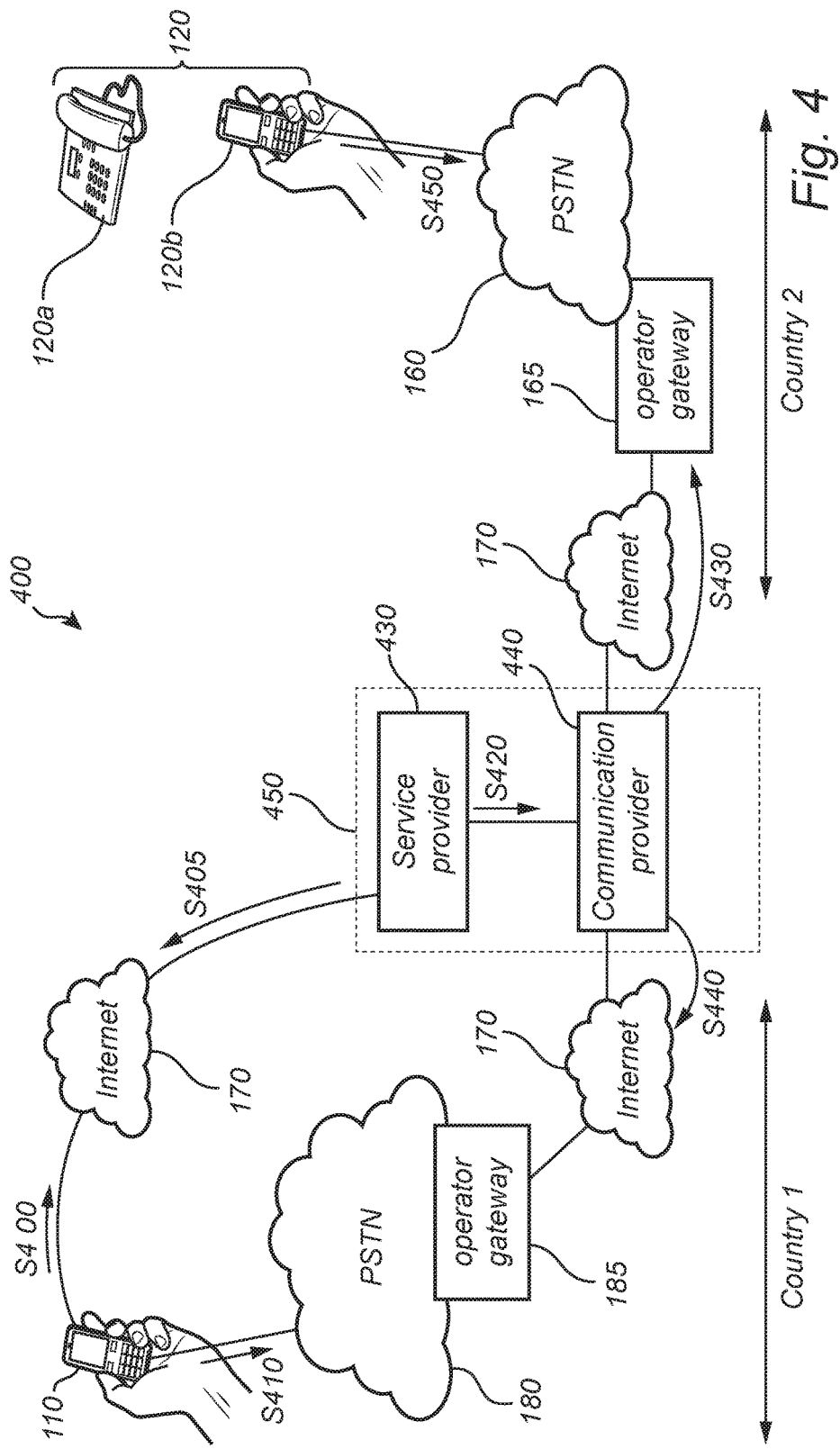
FIG. 4 illustrates a procedure for establishment of an end-to-end call in accordance with another embodiment.
Figure 5:
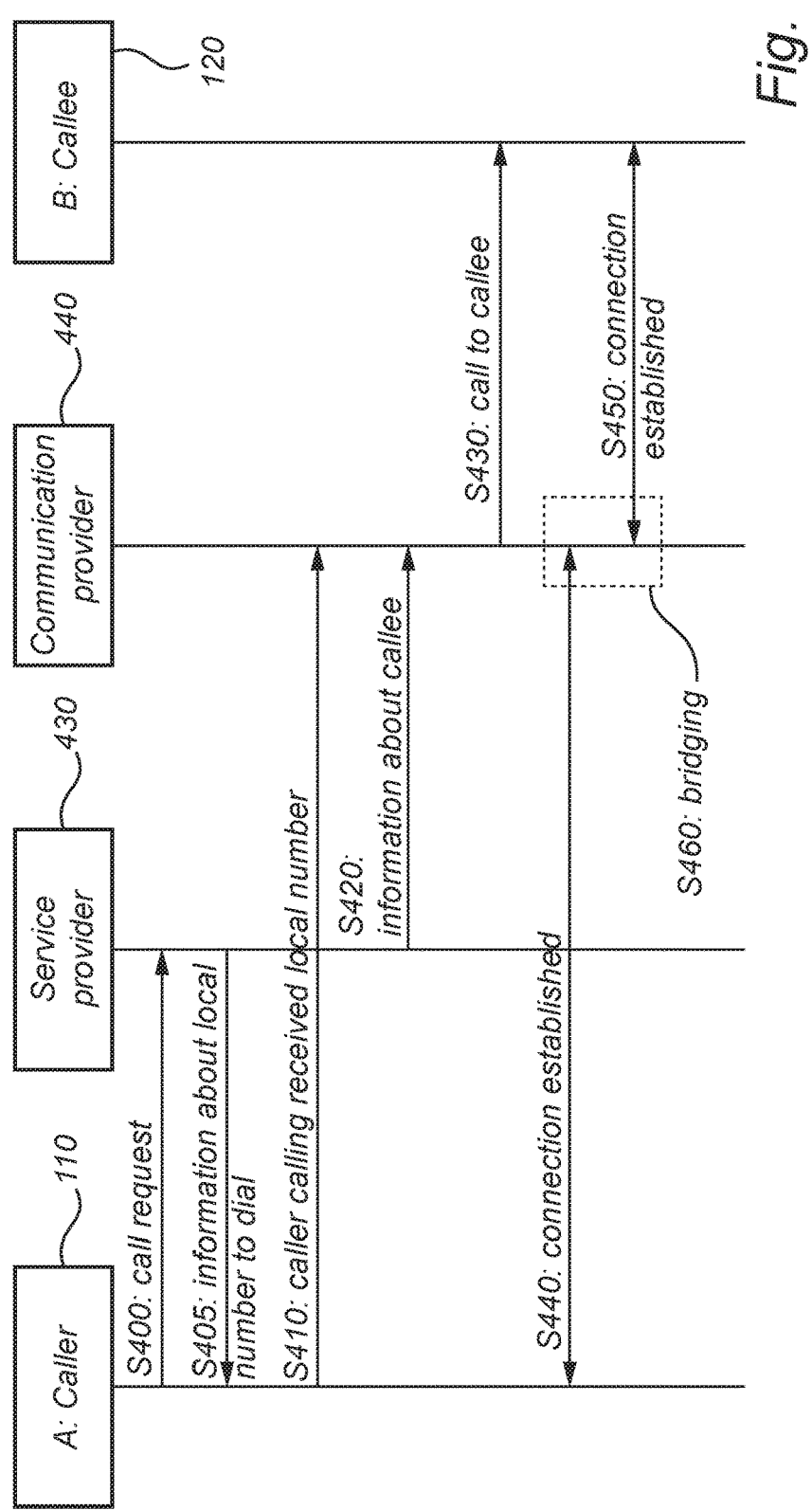
FIG. 5 shows a schematic view of a communication system for establishment of an end-to-end call in accordance with the procedure shown in FIG. 4.

With reference to FIGS. 4 and 5, another embodiment of a procedure for establishment of an end-to-end call between user A and user B will be described.

The procedure described with reference to FIGS. 4 and 5 is identical to the procedure described with reference to FIGS. 1-3 except that the first communication device 110 does not directly call the communication provider 140 but instead needs to receive a telephone number to be dialed. The telephone number is associated with the communication provider in the first country.

The service provider 430 (or the communication server system 450) may therefore be configured as the service provider 130 described with reference to FIGS. 1-3 but, at reception of the call setup request sent at S400 from the first communication device 110, it is configured to at S405 send information about a local telephone number (i.e. a telephone number to be used to call a recipient in the first country) to the first communication device 110 for establishing a connection with the communication provider 440 (which may be equivalent to the communication provider 140 described with reference to FIGS. 1-3).

The steps denoted S400, S410, S420, S430, S440, S450 and S460 in FIGS. 4 and 5 may be equivalent to the steps S200, S210, S220, S230, S240, S250 and S260, respectively, referred to when describing FIGS. 1-3.

In this embodiment, user A (or the first party) places a call in an application of its communication device 110 with a PSTN telephone number. The application makes a REST request to the backend, i.e. the service provider 430 and the communication provider 440, telling it to start calling user B (the second party). User A calls in to the communication provider (the platform) 440 and, in parallel, the platform calls out to user B. When both legs are connected, the communication provider 430 bridges the two legs.

In this embodiment, the total time for connection of the caller 110 to the callee 120 will be the time required for bridging the two communication channels and the longest of the two times required for (i) establishing call$_A$ including the times to perform S400, S405, S410 and S440 and (ii) establishing call$_B$ including the times to perform S400, S420, S430, S450.

Figure 6:
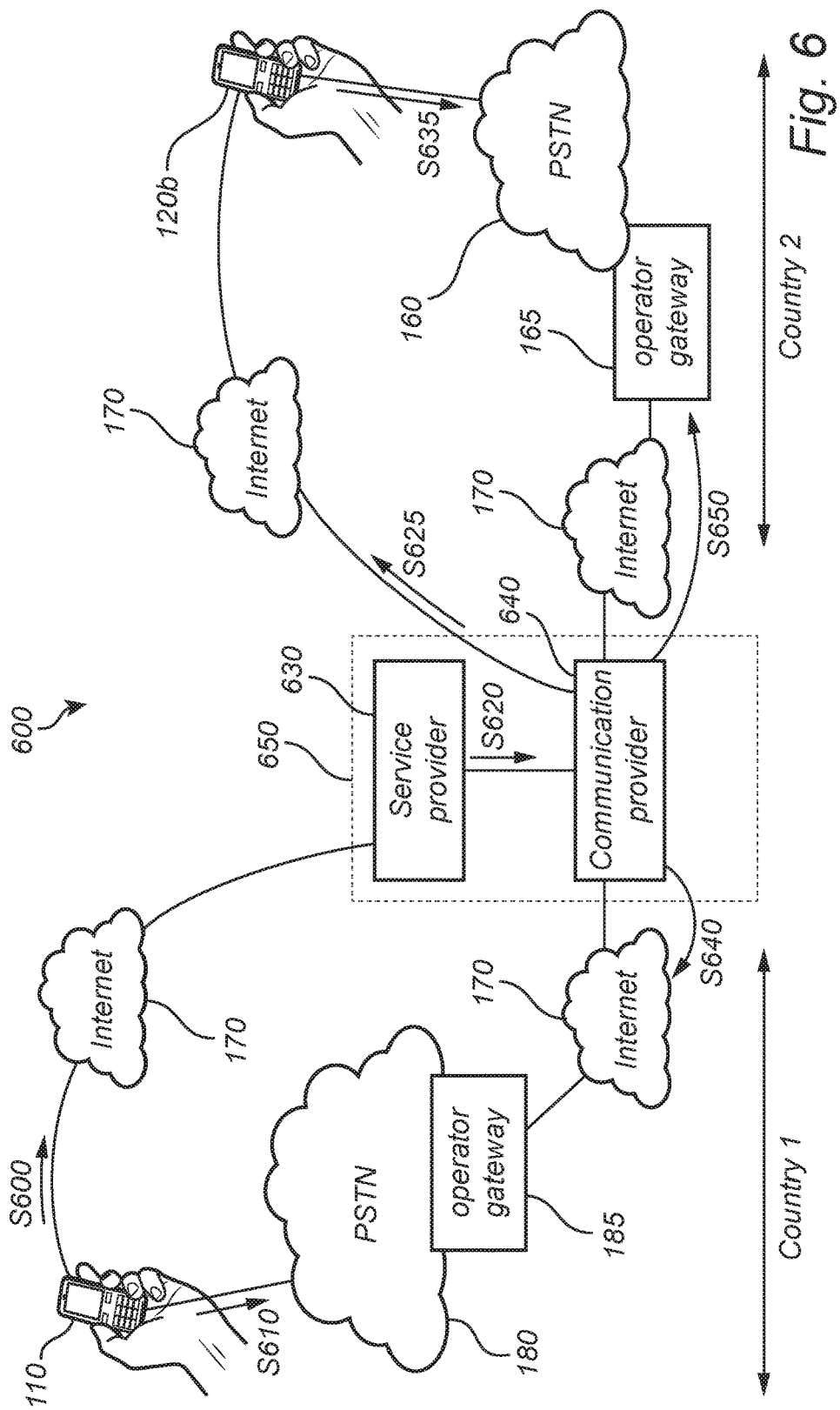
FIG. 6 illustrates a procedure for establishment of an end-to-end call in accordance with yet another embodiment.
Figure 7:
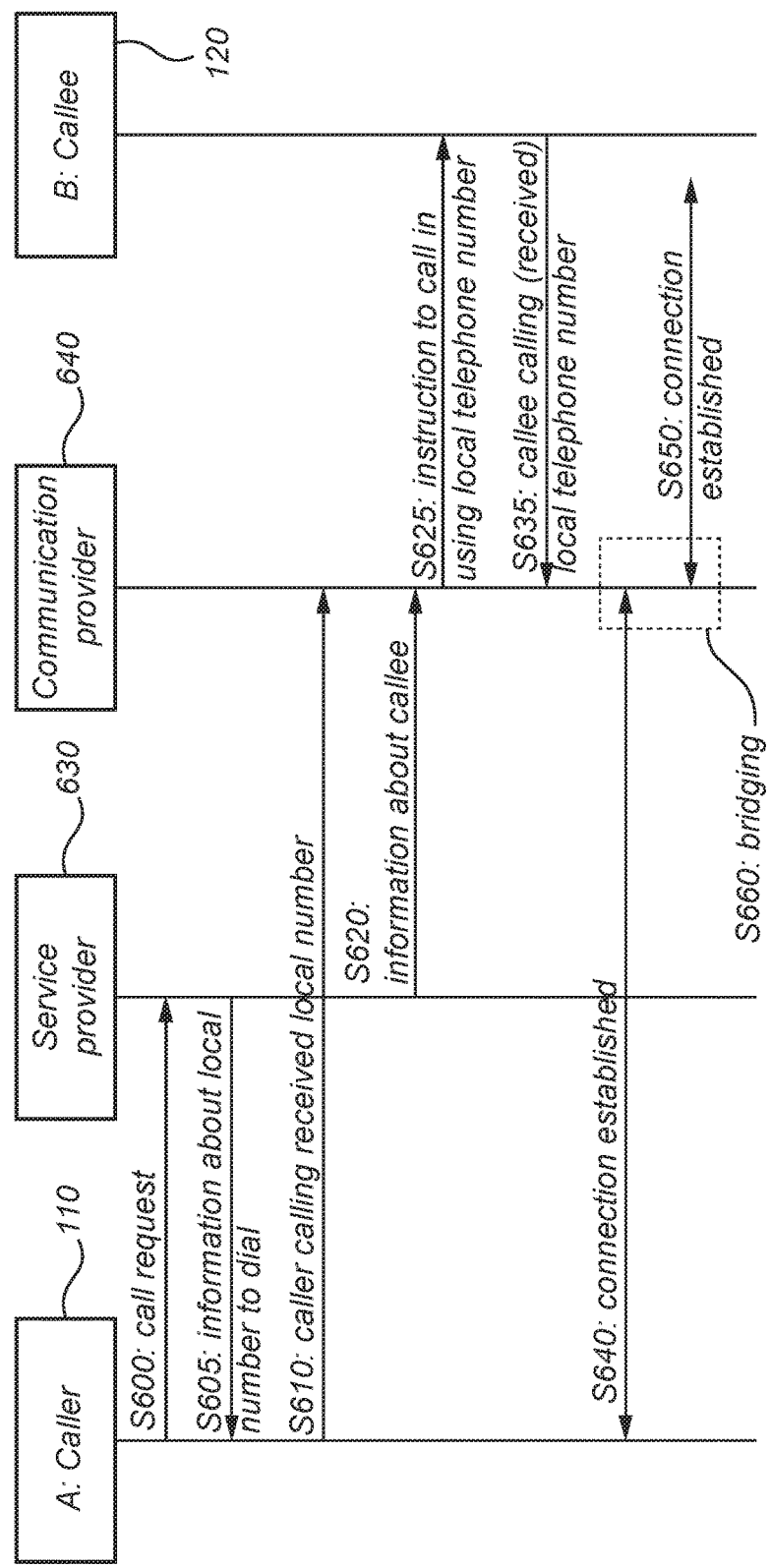
FIG. 7 shows a schematic view of a communication system for establishment of an end-to-end call in accordance with the procedure shown in FIG. 6.

With reference to FIGS. 6 and 7, another embodiment of a procedure for establishment of an end-to-end call between user A and user B will be described.

The procedure described with reference to FIGS. 6 and 7 is identical to the procedure described with reference to FIGS. 4 and 5 except that the second communication device 120b may also have an application connected to the service provider (denoted 630 in FIG. 6) and the service provider 630, or alternatively the communication provider 640, instructs the second communication device 120b to call in (i.e. call to the communication provider 640). In this embodiment, the communication provider 640 does not make an outgoing call to the second communication device 120b but it is the second communication device 120b that calls the communication provider 640.

In one embodiment, the message may be sent from the communication provider 640 to the second communication device 120b via a supplementary communication channel, such as via the Internet 170.

The communication provider 640 (or the communication server system 650) may be configured as the communication provider 430 described with reference to FIGS. 4 and 5 but, at reception, at S620, of the information relative to the call setup request sent at S600 from the first communication device 110 to the service provider 630, it is configured to, at S625, send instructions to the second communication device 120 to call in (i.e. call to the communication provider 640) if user B of the second communication device 120b desires to accept the call from user A of the first communication device 110.

The steps denoted S600, S605, S610, S620, S640, S650 and S660 in FIGS. 6 and 7 may be equivalent to the steps S400, S405, S410, S420, S440, S450 and S440, respectively, referred to when describing FIGS. 4 and 5.

At S625, for establishing the communication channel between the communication provider 640 and the second communication device 120b, the communication provider 640 instructs the second communication device 120b to call the communication provider 640. As depicted in FIG. 6, in one particular embodiment, the communication provider 640 may send a message including an identity of a communication channel, such as a telephone number, for the second communication device 120b to call the communication provider 140 via the PSTN 160 in the second country.

In this embodiment, the total time for connection of the caller 110 to the callee 120 will be the time required for bridging the two communication channels and the longest of the two times required for (i) establishing $call_A$ including the times to perform S600, S605, S610 and S640 and (ii) establishing $call_B$ including the times to perform S600, S620, S625, S635 and S650.

In this embodiment, two incoming calls to the communication provider or platform 640 are made in parallel. The communication provider 640 then bridges the two calls like in a conference. In this embodiment, user A (or the first party) places a call in its application at the first communication device 110 with a PSTN telephone number. The application makes a REST request to the backend, i.e. the service provider 630 and the communication provider 640, telling it to start calling user B (the second party). When the application's REST request arrives at the service provider 630 (or communication server system 650), the communication provider 640 (being informed by the service provider 630) pushes a message to user B to instruct user B (or the second communication device 120b) to call in if the call from user A is to be accepted. User A is then calling in to the communication provider (the platform) 640 concurrently to user B. When both communication channels (or $call_A$ and $call_B$) are established, the two calls are bridged.

The present disclosure provides also for a computer program product, loadable into an internal memory of a communication server unit (or communication server instrument), comprising software code portions for causing a service provider and a communication provider of the communication server unit (or communication server instrument) to perform steps in accordance with any one of the above described embodiments.

The present disclosure provides also for a communication server system (or communication server instrument) including a communication provider and a service provider such as any one of the communication providers and service providers described in the above embodiments.

The present disclosure provides also for an application component, which may also be referred to as an application programming interface, which may be used as a component for the design of applications providing services as offered by a service provider. The application component may be configured to provide communication via the application of the service provider. The application component may be configured to bring a first communication device (or a first party) of a first communication network in communication with a second communication device (or a second party) of a second communication network by causing a communication provider to perform the steps as defined in any one of the embodiments disclosed herein.

Although features and elements are described above in particular combinations, each feature or element may be used alone without the other features and elements or in various combinations with or without other features and elements. In addition, the methods described herein may be implemented in a computer program, software, or firmware incorporated in a computer-readable medium for execution by a computer or processor. Examples of computer-readable media include electronic signals (transmitted over wired or wireless connections) and non-transitory computer-readable storage media. A processor in association with software may be used to implement the methods described herein.

Further, although the embodiments described herein are to some extent more specific to establishment of a voice call, the embodiments of the present disclosure are not limited to voice calls but may also be applied for establishment of a video call or a text chat.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method for establishing communication between a first communication device of a first communication network and a second communication device of a second communication network, the method comprising:
   receiving, at a service provider, a message indicative of an intention of the first communication device to call the second communication device;
   establishing, at a communication provider in communication with the service provider, a first communication channel with the second communication device via the second communication network based on the message received at the service provider; and
   connecting, at the communication provider, the first communication channel established between the communication provider and the second communication device with a second communication channel established in response to an incoming call from the first communication device to the communication provider via the first communication network;
   wherein the establishment of the first communication channel between the communication provider and the second communication device is initiated before establishment of the second communication channel between the first communication device and the communication provider is completed.

2. The method of claim 1, wherein establishing the first communication channel between the second communication device and the communication provider is performed concurrently with the establishment of the second communication channel between the communication provider and the first communication device.

3. The method of claim 1, further comprising sending from the service provider an acknowledgement of the message to the first communication device, the acknowledgement including an identity of the second communication channel for the first communication device to call the communication provider via the first communication network.

4. The method of claim 3, wherein sending the acknowledgement from the service provider is performed simultaneously to sending information from the service provider to the communication provider for establishment of the first communication channel between the communication provider and the second communication device.

5. The method of claim 1, wherein the message is received via an Internet connection between the first communication device and the service provider.

6. The method of claim 1, wherein the first communication network includes at least one of a mobile network, a packet-switched network and a circuit-switched telephone network.

7. The method of claim 1, wherein establishing the first communication channel between the communication provider and the second communication device comprises establishing an outgoing call from the communication provider to the second communication device via the second communication network.

8. The method of claim 1, wherein establishing the first communication channel between the communication provider and the second communication device comprises the service provider instructing the second communication device to call the communication provider.

9. The method of claim 8, wherein instructing the second communication device to call the communication provider includes sending from the communication provider a message including an identity of the first communication channel for the second communication device to call the communication provider via the second communication network.

10. The method of claim 9, wherein the message is sent from the communication provider to the second communication device via an Internet connection.

11. The method of claim 1, further comprising sending, from the service provider to the communication provider, a message indicating the incoming call from the first communication device via the first communication network and including information for establishment of the first communication channel with the second communication device.

12. The method of claim 1, wherein the service provider and the communication provider are included in the same entity.

13. The method of claim 1, further comprising establishing at the communication provider the second communication channel with the first communication device upon reception of the incoming call from the first communication device.

14. The method of claim 1, wherein the communication between the first communication device and the second communication device is at least one of a voice call, a video call and a text chat.

15. An application component for providing communication via an application of a service provider, said application component being configured to bring a first communication device of a first communication network in communication with a second communication device of a second communication network by causing a communication provider to:
receive a message from the service provider, the message indicating an intention of the first communication device to call the second communication device;
establish a first communication channel with the second communication device via the second communication network based on the received message; and
connect the first communication channel established between the communication provider and the second communication device with a second communication channel established in response to an incoming call from the first communication device to the communication provider via the first communication network;
wherein the establishment of the first communication channel between the communication provider and the second communication device is initiated before establishment of the second communication channel between the first communication device and the communication provider is completed.

16. The application component of claim 15, wherein the message is received via an Internet connection between the first communication device and the service provider.

17. The application component of claim 15, being further configured to cause the communication provider to establish an outgoing call to the second communication device via the second communication network.

18. The application component of claim 15, being further configured to cause the service provider to instruct the second communication device to call the communication provider.

19. A communication server system including:
a service provider configured to receive a message indicative of an intention of a first party to call a second party; and
a communication provider configured to establish a call with the second party based on the message received at the service provider and to connect the call established with the second party with an incoming call from the first party;
wherein the service provider and the communication provider are in communication with each other and wherein the establishment of the call between the communication provider and the second party is initiated before establishment of the incoming call from the first party to the communication provider is completed.

20. The communication server system of claim 19, wherein the first party includes a first communication device configured to communicate with the communication provider via a first communication network and the second party is a second communication device configured to communicate with the communication provider via a second communication network.

* * * * *